Nov. 14, 1961 T. F. MATHESON 3,008,481
DIFFERENTIAL PRESSURE SELECTOR
Filed May 22, 1959
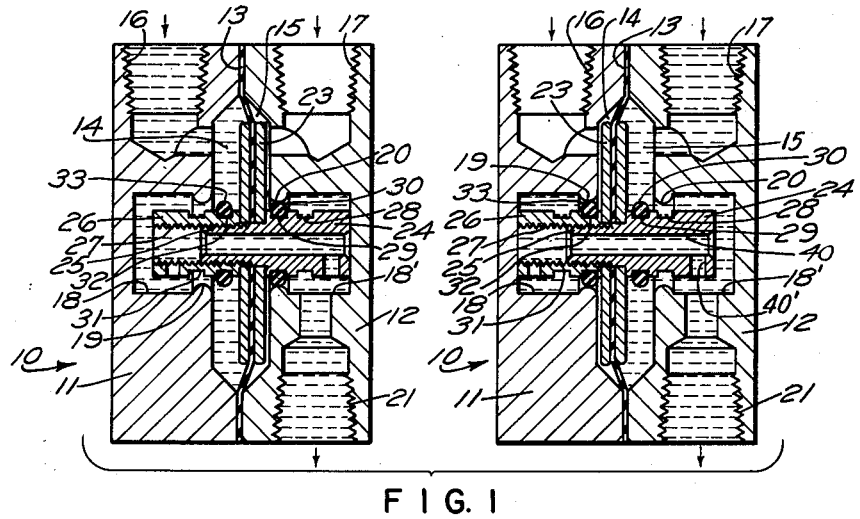
FIG. 1
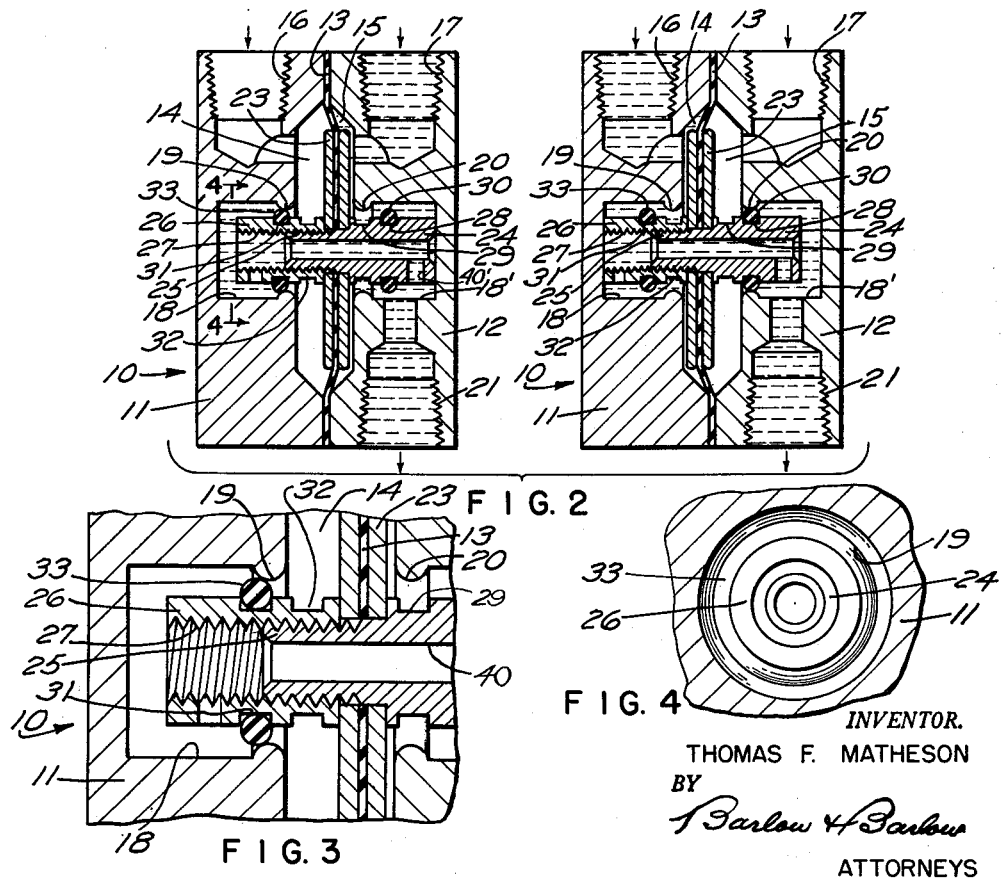
FIG. 2
FIG. 3
FIG. 4
INVENTOR.
THOMAS F. MATHESON
BY
Barlow & Barlow
ATTORNEYS

3,008,481
DIFFERENTIAL PRESSURE SELECTOR
Thomas F. Matheson, Barrington, R.I., assignor to George W. Dahl Company, Inc., a corporation of Rhode Island
Filed May 22, 1959, Ser. No. 815,072
2 Claims. (Cl. 137—112)

This invention relates to a pressure responsive mechanism sometimes known as a relay which is adapted for employment in pneumatic control systems. More particularly, it relates to a pressure selector relay which will transmit either the lower of two pressures or the higher of two pressures.

The employment of such a selector is sometimes quite important in pneumatic control circuitry as a safety measure. For example, if the control pressure drops below a certain level, then a signal will be transmitted which perhaps will actuate some device that will shut off the process of whatever is being controlled which would otherwise be damaged if a low signal were permitted to continue. Conversely, a high signal may indicate trouble and in the same vein, a signal should be transmitted to prevent damage due to the presence of this high signal in the control circuitry. Thus, a device of this nature will control a process or a machine under adverse conditions. It is therefore an object of this invention to provide a relatively simple and inexpensive device which may be directly connected to the pneumatic control circuitry and which will transmit either the lower of two pressures or the higher of two pressures.

It is a further object of this invention to provide a device which may be readily modified in the field to change its selection characteristics.

With these and other objects in view, the invention consists of certain lovel features of construction, as will be more fully described and particularly pointed out in the appended claims.

In the accompanying drawings:

FIGURE 1 is a sectional view taken through the body of the pressure selector which is arranged to select a high signal, two separate views illustrating this operation;

FIGURE 2 is a sectional view taken through the body of the pressure selector shown arranged for selecting a low signal, two views showing this operation taking place;

FIGURE 3 is an enlarged sectional view of the value seat portion; and

FIGURE 4 is a sectional view taken on line 4—4 of FIGURE 2.

Referring now to the drawings, 10 generally designates the body of a pressure selector which consists of two portions 11 and 12 which portions enclose a central compartment. A movable member or wall such as a flexible diaphragm 13 is sealingly clamped between the two portions 11 and 12 and divides the central compartment into two chambers 14 and 15. Chamber 14 is provided with a port or opening 16 and chamber 15 is provided with a port or opening 17. Surrounding the two chambers 14 and 15 within the general body 10 is a pair of third generally cylindrical chambers 18, 18'. Chamber 18 communicates with chamber 14 through a cylindrical opening or seat 19 and chamber 18' communicates with the chamber 15 through an opening or seat 20. Chamber 18' is provided with an outlet port 21 which as will be seen presently may communicate with chambers 14 or 15 selectively and thus with inlet ports 16 or 17 respectively.

The diaphragm 13 actuates a valve plug which selectively closes off either the opening 19 or the opening 20. To accomplish this result, a pair of buttons 23 are clamped to the central area of the diaphragm 13 and secured to these buttons and diaphragms is the valve plug. This valve plug is made up of two parts for easy assembly and consists of a first portion 24 which is provided with a male threaded end as at 25 and a bore 40, 40'. A mating section 26 is provided with a threaded female bore 27 for cooperation with the threaded end 25 and continuation of the bores 40, 40'. The portion 24 is provided with two sets of annular grooves 28 and 29 which grooves are adapted to receive O-rings such as the O-ring 30 shown received in groove 29 in FIG. 1. Similarly, the second portion 26 is formed with two annular grooves 31 and 32, the groove 32 in FIG. 1 shown as receiving an O-ring 33. The arrangement illustrated is such that the two portions 24 and 26 may be secured together which securing will also clamp the buttons 23 on to the diaphragm 13 to provide a completed structure. It will be apparent that the O-ring 30 cooperates with the seat or opening 20 while the O-ring 33 cooperates with the seat or opening 19.

To understand the operation of this pressure selector, let us assume that the port 16 is in communication with a fluid pressure of a given value, while the port 17 is in communication with a source of fluid pressure greater or less in value than that to which the port 16 is subjected. Assuming, for example, that the pressure at port 16 is greater than the pressure at port 17, then the pressure in chamber 14 will be greater than that in chamber 15. The diaphragm 13 will be flexed therefore and the O-ring 30 will seal off communication between the chamber 15 and the chamber 18' at seat 20. However, communication is had between the chamber 14 and the chamber 18, and accordingly, a high pressure existent in chamber 14 is transmitted to the outlet port 21 through bores 27, 40, 40'. Similarly, but conversely, let us assume that the pressure at port 17 is higher than that existent at port 16. When this is the case, the diaphragm 13 will flex in the opposite direction and communication will be had between the chamber 15 and the chamber 18' through bores 40', 40, 27, thus again selecting the higher of the two pressures existent at ports 16 and 17.

In the alternate arrangement shown in FIG. 2, a reverse operation may be had and a low signal may be selected. Accordingly, let it be assumed that the port 16 and its chamber 14 is connected to a source of fluid pressure of a given value while the port 17 and its associated chamber 15 is connected to a source of fluid pressure greater or less in value than that to which the port 16 and its chamber 14 are subjected. For example, therefore, if the pressure in chamber 14 is greater than the pressure in chamber 15, the diaphragm 13 will be flexed as shown in the left portion of FIG. 2 moving the assembly to the right as viewed in the drawing. In this case, however, the O-ring 33 and the O-ring 30 have been moved from their previous position and now engage in recesses 31 and 28 respectively. With the O-rings in this position and with the diaphragm flexed as shown in the lefthand portion of FIG. 2, communication between chamber 14 and chamber 18 is closed off, while communication is had between chamber 15 and chamber 18'. With this set of circumstances the lower of the two signals is selected. Alternately, if the pressure in chamber 14 is lower than that existent in chamber 15, the diaphragm 13 will be flexed to the left as shown in the righthand portion of FIG. 2 and accordingly the O-ring 30 which is now disposed in the groove 28 will move to close off the opening 20 and communication is had only between the chamber 14 and the chamber 18, thereby transmitting the lowest of the two signals to the outlet port 21.

It will accordingly be appreciated that by a simple change in the field that is, by changing the O-rings from one set of grooves to another set of grooves in the valve plug that entirely different operations may be had. The pressure selector may thereby be made to select either a high or low signal at will in accordance with the demands in the field. Such an arrangement saves the stocking of a multiple number of pressure selectors for by a simple adjustment any one selector may be made to operate in either desired fashion.

I claim:

1. A fluid pressure responsive device comprising a casing defining a compartment, a flexible diaphragm dividing said compartment into a pair of chambers, each of said chambers having a seat providing a sealable opening therein, said chambers through said openings having communication with an outlet port from said device, a pair of valve plugs positioned in each of said chambers for cooperation with said seats, said valve plugs interconnected by common means including said diaphragm, each of said plugs provided with a pair of spaced annular grooves therein, one groove of each pair being adjacent said diaphragm defining an inner set of grooves and the other groove of each pair defining an outer set of grooves, the spacing between the inner set of grooves being less than the distance between said seats, the spacing between the outer set of grooves being greater than the distance between said seats, sealing rings received in one set of said grooves, a source of fluid pressure in communication with each of said chambers, said diaphragm being responsive to a differential pressure between said sources of fluid pressure to move said valve plugs to seal off communication between the one of said chambers having the lower pressure and said outlet port and open communication with the other chamber and said outlet port when said sealing rings are in the inner set of grooves and to seal off communication between the one of said chambers having the higher pressure and said outlet port and open communication with the other chamber and said outlet port when said sealing rings are in the outer set of grooves.

2. A device as in claim 1 wherein the valve plugs are in axial alignment and said openings are in axial alignment and the communication between one of the openings and said outlet port is had by a passageway extending axially through the plugs.

References Cited in the file of this patent

UNITED STATES PATENTS

| | | |
|---|---|---|
| 2,285,686 | Shanley | June 9, 1942 |
| 2,631,600 | Flanagan | Mar. 17, 1953 |
| 2,778,373 | Jaquith | Jan. 22, 1957 |
| 2,880,748 | Elsey | Apr. 7, 1959 |